United States Patent
Bharani et al.

(10) Patent No.: US 8,052,200 B2
(45) Date of Patent: Nov. 8, 2011

(54) VEHICLE CAB FLOOR PROTECTION SYSTEM

(75) Inventors: Sanjeev Bharani, Normal, IL (US); Shailendra Singh, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 555 days.

(21) Appl. No.: 11/980,676

(22) Filed: Oct. 31, 2007

(65) Prior Publication Data

US 2009/0108628 A1   Apr. 30, 2009

(51) Int. Cl.
*B62D 25/20* (2006.01)
(52) U.S. Cl. ......... 296/190.08; 296/190.03; 296/190.01; 89/36.08; 89/36.01; 89/36.09
(58) Field of Classification Search ............. 296/187.08, 296/190.01, 190.03, 190.08, 191, 193.07, 296/199, 198, 39.1, 39.3, 900; 89/36.01, 89/36.07, 36.08, 36.09; 280/748
See application file for complete search history.

(56) References Cited

U.S. PATENT DOCUMENTS

| | | | |
|---|---|---|---|
| 3,121,825 A * | 2/1964 | Abegg et al. ................. 361/215 |
| 4,326,445 A | 4/1982 | Bemiss | |
| 4,404,889 A | 9/1983 | Miguel | |
| 4,979,425 A | 12/1990 | Sprague | |
| 5,149,910 A | 9/1992 | McKee | |
| 5,452,641 A | 9/1995 | Kariya | |
| 5,517,894 A * | 5/1996 | Bohne et al. ................. 89/36.02 |
| 5,533,781 A * | 7/1996 | Williams ...................... 296/204 |
| 5,663,520 A | 9/1997 | Ladika et al. | |
| 6,149,226 A | 11/2000 | Hoelzel et al. | |
| 6,497,966 B2 | 12/2002 | Cohen | |
| 6,658,984 B2 | 12/2003 | Zonak | |
| 6,792,843 B2 * | 9/2004 | Mohr et al. ................... 89/36.02 |
| 7,004,533 B2 * | 2/2006 | Arthur et al. ............. 296/190.08 |
| 7,114,764 B1 | 10/2006 | Barsoum et al. | |
| 7,350,851 B2 * | 4/2008 | Barvosa-Carter et al. ........................ 296/187.02 |
| 2002/0145308 A1 * | 10/2002 | Honlinger ..................... 296/193 |
| 2003/0151274 A1 * | 8/2003 | Buisson et al. .......... 296/190.08 |
| 2003/0234557 A1 * | 12/2003 | Bock et al. .............. 296/190.08 |
| 2006/0201319 A1 | 9/2006 | De Wet | |
| 2007/0084337 A1 | 4/2007 | Strassgurtl et al. | |

* cited by examiner

*Primary Examiner* — Glenn Dayoan
*Assistant Examiner* — Sunsurraye Westbrook
(74) *Attorney, Agent, or Firm* — Finnegan, Henderson, Farabow, Garrett & Dunner LLP

(57) ABSTRACT

The present disclosure is directed to a protection system for a vehicle cab. The protection system includes a first structure and a second structure. The first structure is disposed between a floor of the vehicle cab and a vehicle tire. The second structure of the protection system is disposed between the first structure and the cab floor. Further, the second structure includes a non-metallic laminate and an air gap disposed between the first structure and the second structure.

20 Claims, 6 Drawing Sheets

VEHICLE CAB FLOOR PROTECTION SYSTEM

TECHNICAL FIELD

The present disclosure relates generally to a floor protection system and, more particularly, to a floor protection system for a vehicle cab.

BACKGROUND

Machines such as, for example, mine trucks, sometimes experience tire blowouts. During a blowout, a significant pressure wave is created. This pressure wave may be capable of causing damage to the machine, and may also turn tire fragments, stones, pebbles, and other metallic objects into high speed projectiles, which can damage the floor of the cab. Heavy steel plates have been used in the past to protect the floor of the cab from flying debris. However, these plates significantly increase overall vehicle weight, reduce maximum payload, and reduce machine stability.

One method of providing undercarriage protection to a cab is described in U.S. Pat. No. 4,404,889 (the '889 patent) issued to Miguel on Sep. 20, 1983. The '889 patent describes a composite armor for vehicles, which attenuates blast loading from a land mine better than a single large steel plate. The composite armor comprises layers of high density steel honeycomb, balsa wood, and ballistic-resistant nylon sandwiched between outer layers of steel armor plate and located in the hull belly or in the walls of the vehicle.

Although the composite armor of the '889 patent may be capable of protecting a vehicle cab from high pressure explosions underneath the vehicle cab, its use in other applications may be limited. That is, because the composite armor is contained within two steel armor plates, it may still contribute significant weight to the machine, decreasing the efficiency, stability, and payload capacity of the machine. Further, the armor disclosed in the '889 patent, while strong enough to withstand blast loading, may not have geometry necessary to dissipate the loading before the shock thereof is transmitted to the cab.

The disclosed vehicle cab floor protection system is directed to overcoming one or more of the problems set forth above.

SUMMARY

In one aspect, the present disclosure is directed to a protection system for a vehicle cab. The protection system includes a first structure and a second structure. The first structure is disposed between a floor of the vehicle cab and a vehicle tire. The second structure of the protection system is disposed between the first structure and the cab floor. Further, the second structure includes a non metallic laminate and an air gap disposed between the first structure and the second structure.

In another aspect, the present disclosure is directed to a method of protecting a vehicle cab from a tire blowout. The method includes deflecting tire debris away from a floor of the vehicle cab, and absorbing energy from both the tire debris and from a pressure wave caused by the blowout. The method further including providing a second structure between the first structure and the vehicle cab floor for deflecting and absorbing energy from the tire blowout. Finally the method includes providing an air gap between the first structure and the second structure.

DETAILED DESCRIPTION

Figure 1:
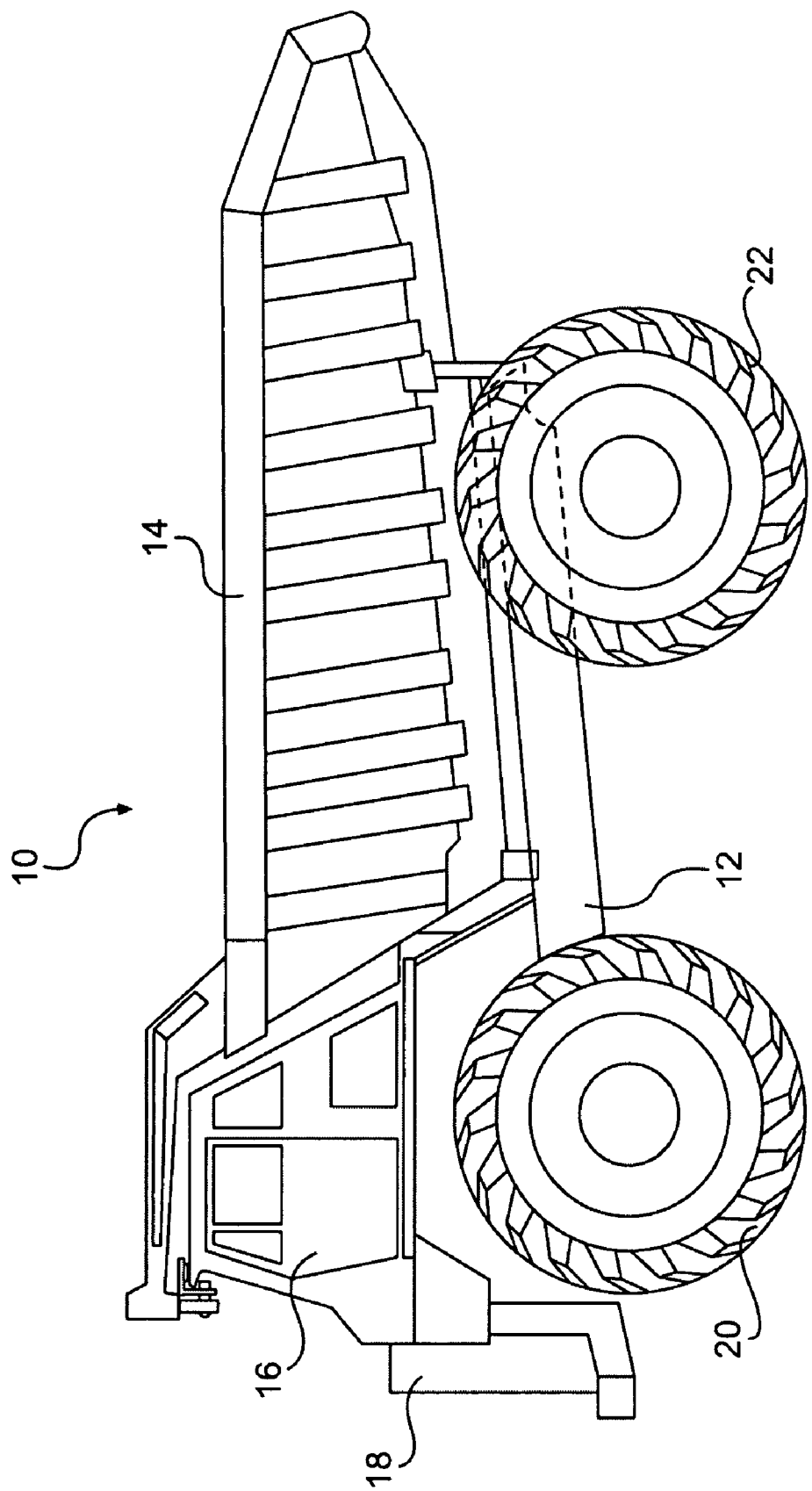
FIG. 1 is a pictorial illustration of an exemplary disclosed machine.

An exemplary embodiment of a machine 10 is illustrated in FIG. 1. In this embodiment, the machine 10 may be a mobile vehicle, and may include a dump body 14, a cab 16, a power source enclosure 18, a set of front tires 20, and a set of rear tires 22. These various elements may be attached to or part of the machine's frame 12, the frame 12 being configured to provide support and integrity to the various elements comprising the machine 10. As used herein, the frame 12 may refer to any element that is generally secured in a fixed position on the machine 10. Further, in the embodiment of FIG. 1, the frame 12 may support machine elements such as the front tires 20 and rear tires 22, the dump body 14, the cab 16, and the power source enclosure 18.

Figure 2:
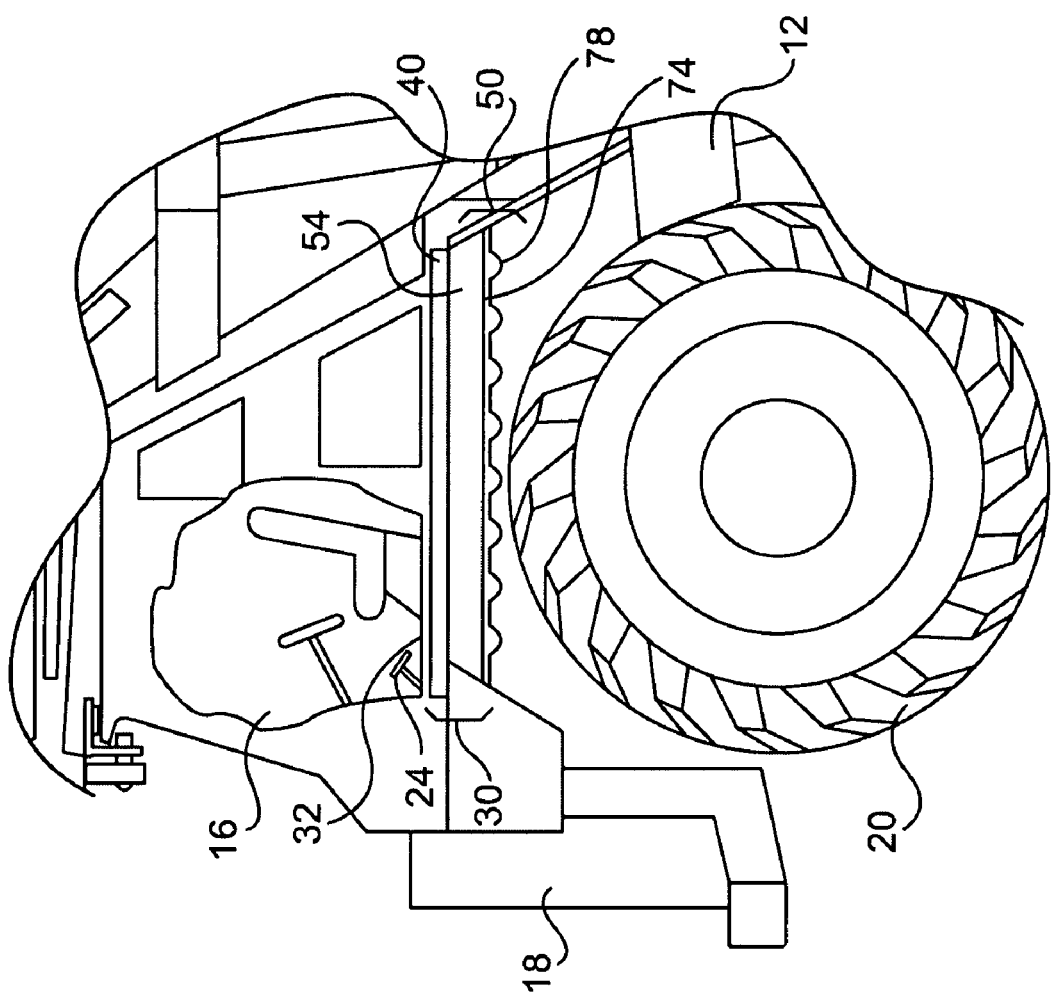
FIG. 2 is a pictorial illustration of an exemplary disclosed cab floor protection system that may be used with the machine of FIG. 1.

In the embodiment shown in FIG. 2, the cab 16 may be attached to the frame 12 and located at least partially over at least one of the front tires 20. The cab 16 may include controls for operating and driving the machine 10, such as a brake or acceleration pedal 24 to selectively affect movement of the front tires 20 and/or the rear tires 22. Further, the cab 16 may have a floor 32 and a floor protection system 30. The floor protection system 30 may act as a barrier between the front tires 20 and the floor 32 of cab 16.

The floor protection system 30 may be comprised of two distinct structures, and may be separated by an air gap 54. The floor protection system 30 may act to protect the floor 32 in the event of a tire blowout. A first structure 50 may be comprised of various layers and materials selected and fabricated to deflect debris and to absorb energy from a blowout of front tires 20. As used herein, energy may refer to various types of energy such as kinetic energy, pressure wave energy and any other type of energy that may be released upon the tire blowout. The first structure 50 may be connected to the frame 12 of the machine 10 using a variety of methods including bolting, riveting, welding, chemical bonding, or any other method known in the art. Some of the materials used in the first structure 50 may be aluminum, steel, and/or energy absorbing foam. Each layer of the first structure 50 may have a geometry that aids in the dissipation of energy through deformation and failure. For instance, a plate 74 may form a first layer of the first structure 50 and include dimples 78. As used herein, dimples or dimpling may refer to any type of substantially hollow protrusion that extends from a base plate, for example semispherical domes. Dimpling a plate may provide regions on the plate where, under the pressure of the tire blowout, crumpling may occur during the absorption of energy. The first structure 50 may be designed to fail thereby diminishing the magnitude of the energy released during the tire blowout and reducing the energy passing through the first structure 50 to the second structure 40.

The second structure 40 may be located just beneath the floor 32 and may be configured to help dissipate energy thereby protecting the cab 16. Further, the second structure 40 may also be connected to the frame 12 using a variety of methods including bolting, riveting, welding, or chemical bonding. Air gap 54 may exist between the first structure 50 and the second structure 40 to isolate the two structures with a layer of atmosphere. In some embodiments, the air gap 54 may space apart the second structure 40 from the first structure 50 and may provide a passage to release energy into the atmosphere. The second structure 40 may also consist of various layers of materials configured to absorb energy from the tire blowout. The second structure 40 may consist of a non-metallic laminate with high tenacity. This non-metallic laminate may largely be composed of any aromatic polyamide such as, for example, Kevlar®, EGlass®, Dyneema®, Spectrasheild®, S2 Glass®, Twaron® or any other puncture resistant nylon.

Figure 3:
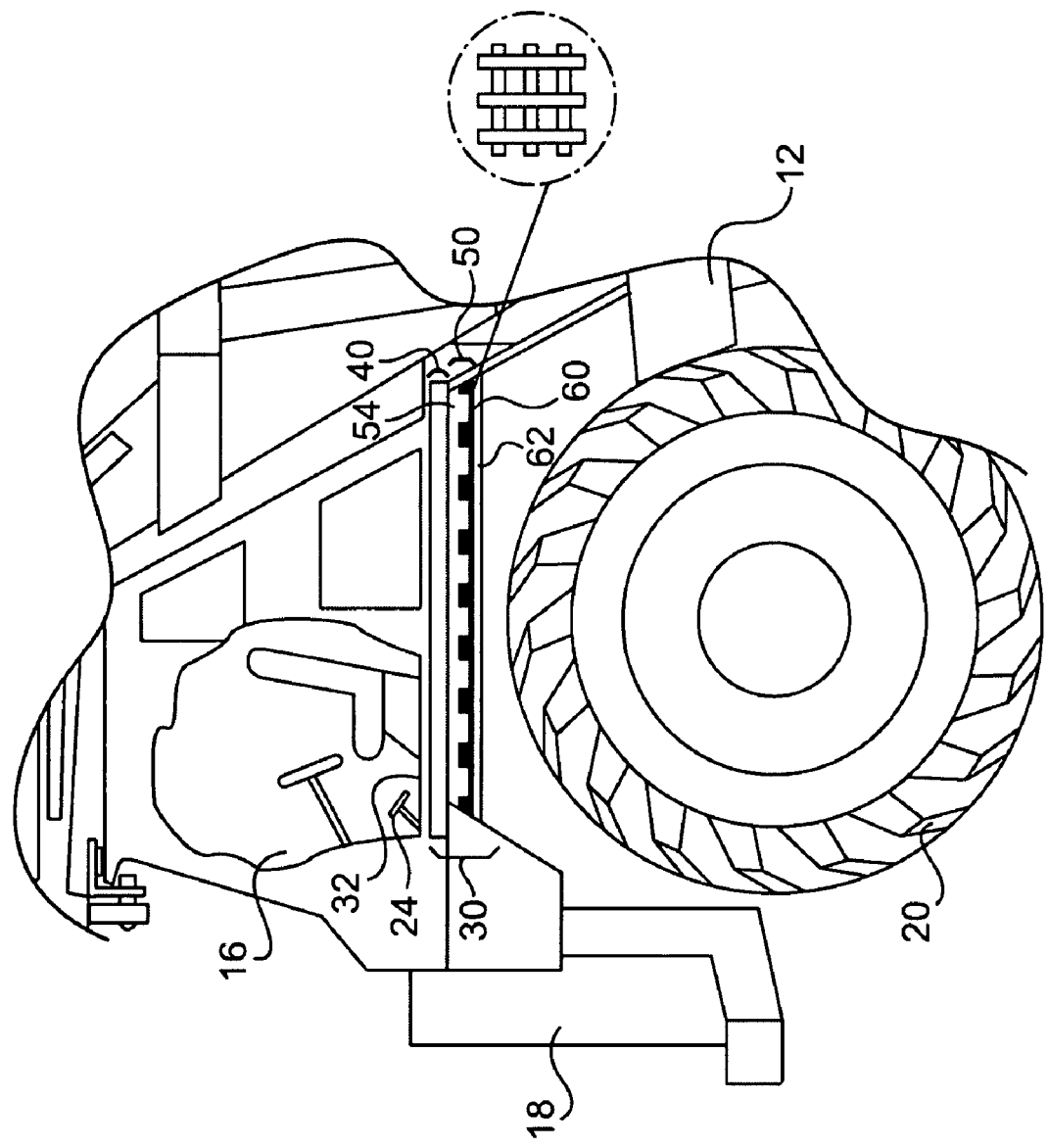
FIG. 3 is a pictorial illustration of another exemplary disclosed cab floor protection system that may be used with the machine of FIG. 1.

In another embodiment, as in FIG. 3, the first structure 50 may be composed of two distinct layers, including a first layer 60 and a second layer 62. The second layer 62 may be a thin ductile metallic plate, which may be backed by a first layer 60 for added strength. In this embodiment, the first layer 60 may embody a rigid metallic matrix, and the second layer 62 may be constructed of a more ductile material that may deform in response to the pressure wave. As used herein, a matrix may refer to any geometry formed by laying and joining rods of material above or below adjacent rods such that the resulting structure is substantially porous. A matrix may enhance the strength of the first structure 50, while reducing weight, as it is not solid. The second layer 62 may deform into the pores of the matrix 60 in response to the pressure wave, thereby dissipating energy from the tire blowout through plastic deformation. In addition to deformation, the matrix of the first layer 60 may deflect and fracture, thereby further absorbing additional energy from the pressure wave. The combined barrier of this described first structure 50 and the previously described second structure 40 may substantially deflect tire debris and reduce the magnitude of the pressure wave and may prevent damage to the cab 16.

Figure 4:
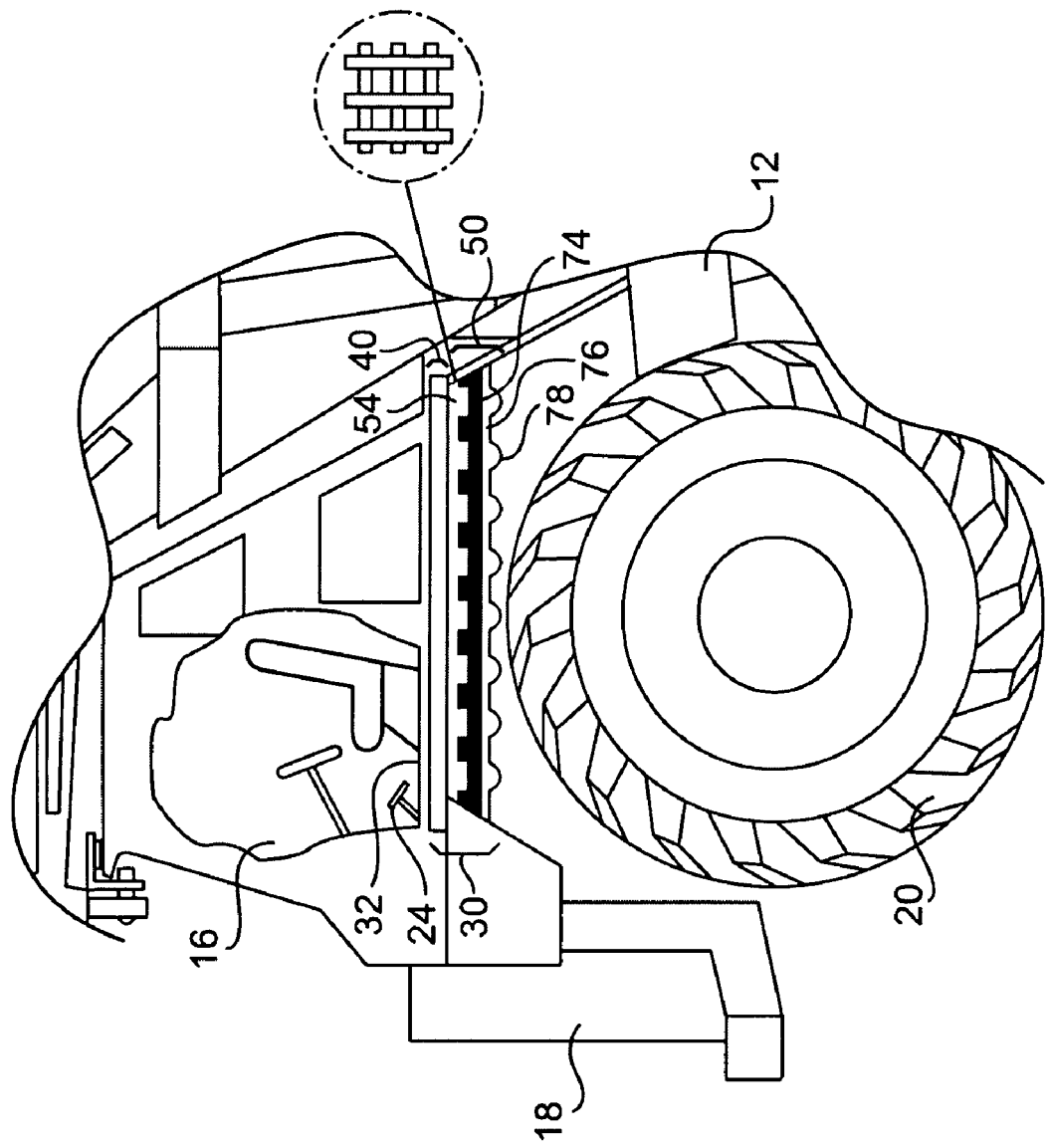
FIG. 4 is a pictorial illustration of another exemplary disclosed cab floor protection system that may be used with the machine of FIG. 1.

In yet another embodiment, as in FIG. 4, the first structure 50 may be composed of a first layer 74 and a second layer 76. The first layer 74 may be composed of a matrix similar to that of the previous embodiment and, the second layer 74 may be composed of a ductile metallic plate with dimples. As the more ductile second layer 76 deforms under the pressure wave during a tire blowout, the semispherical domes 78 of the second layer 76 may deform into the matrix of the first layer 74, absorbing energy through plastic deformation and thereby reducing the magnitude of the pressure wave. In addition to deformation, the semispherical domes 78 of the second layer 76 may deform and possibly fail into the matrix of the first layer 74, thereby further absorbing energy from the pressure wave and reducing the magnitude of the pressure wave passed onto the second structure 40. The combined barrier of this first structure 50 and the previously described second structure 40, may substantially reduce the impact of a tire blowout on the cab 16.

Figure 5:
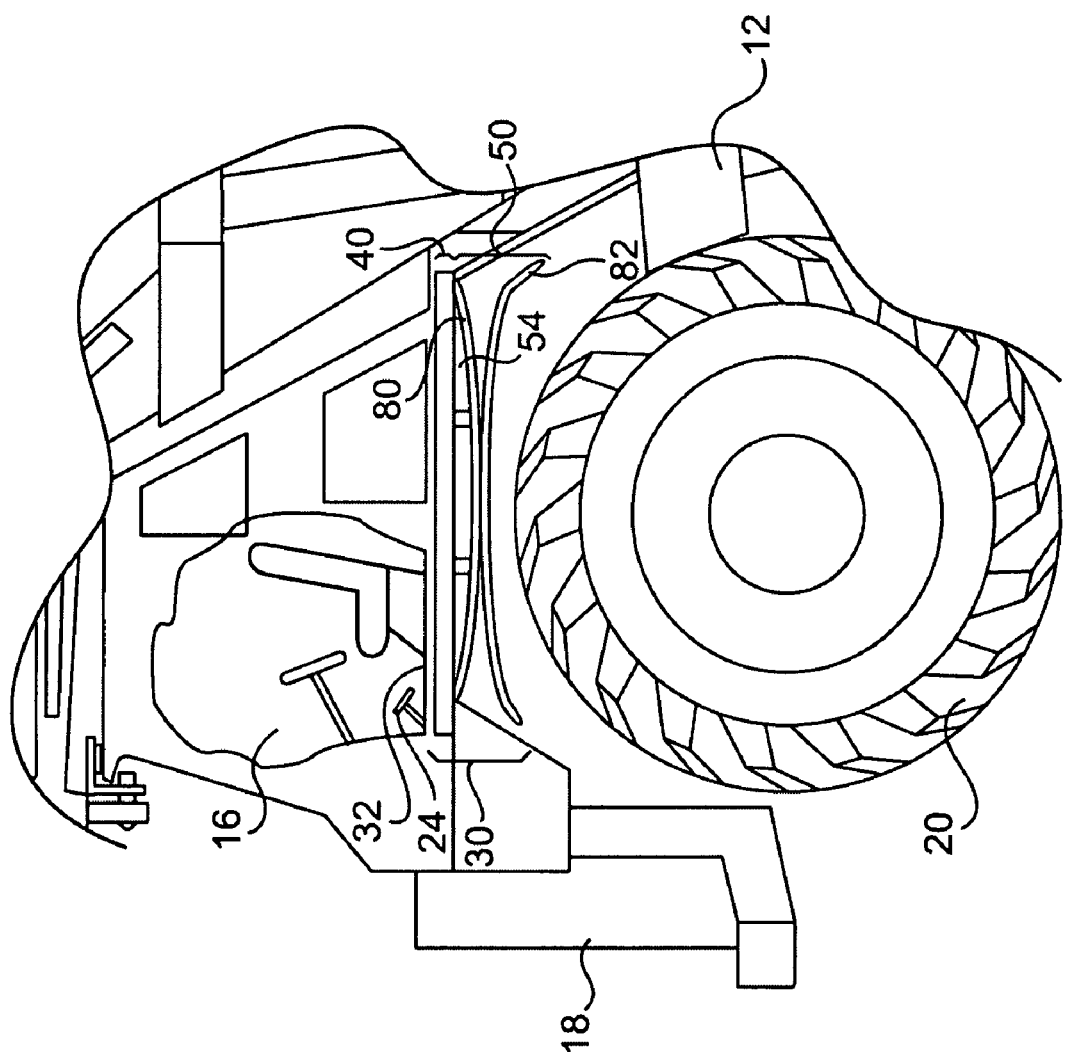
FIG. 5 is a pictorial illustration of another exemplary disclosed cab floor protection system that may be used with the machine of FIG. 1.

In still another embodiment, as in FIG. 5, the first structure 50 may be composed of a first curved layer 80 and a second curved layer 82. The first curved layer 80 may be a generally convex metallic plate, with its inward surface facing the cab floor 32. The first curved layer 80 may be backed with a generally concave metallic plate of the second curved layer 82 with its inward surface facing the front tires 20. Further, this embodiment may or may not utilize the grid from the previous embodiment to reinforce the apex region (not shown in FIG. 5) of the first curved layer 80. In this embodiment, the second curved layer 82 may bend (i.e. become more flattened) to absorb energy in the event of a tire blowout, and may focus the pressure wave toward an apex of the second curved layer 82. The first curved layer 80 may provide a strengthened region at the apex to further absorb energy. In addition to the first structure 50, the second layer may also deform or flatten somewhat to reduce energy resulting from a tire blowout, thereby helping to dampen the pressure wave transmitted to the cab 16. The combined energy absorbing properties of the first structure 50 combined with the energy absorbing properties of the second structure 40, may sufficiently diminish the pressure wave reaching the cab floor 32.

Figure 6:
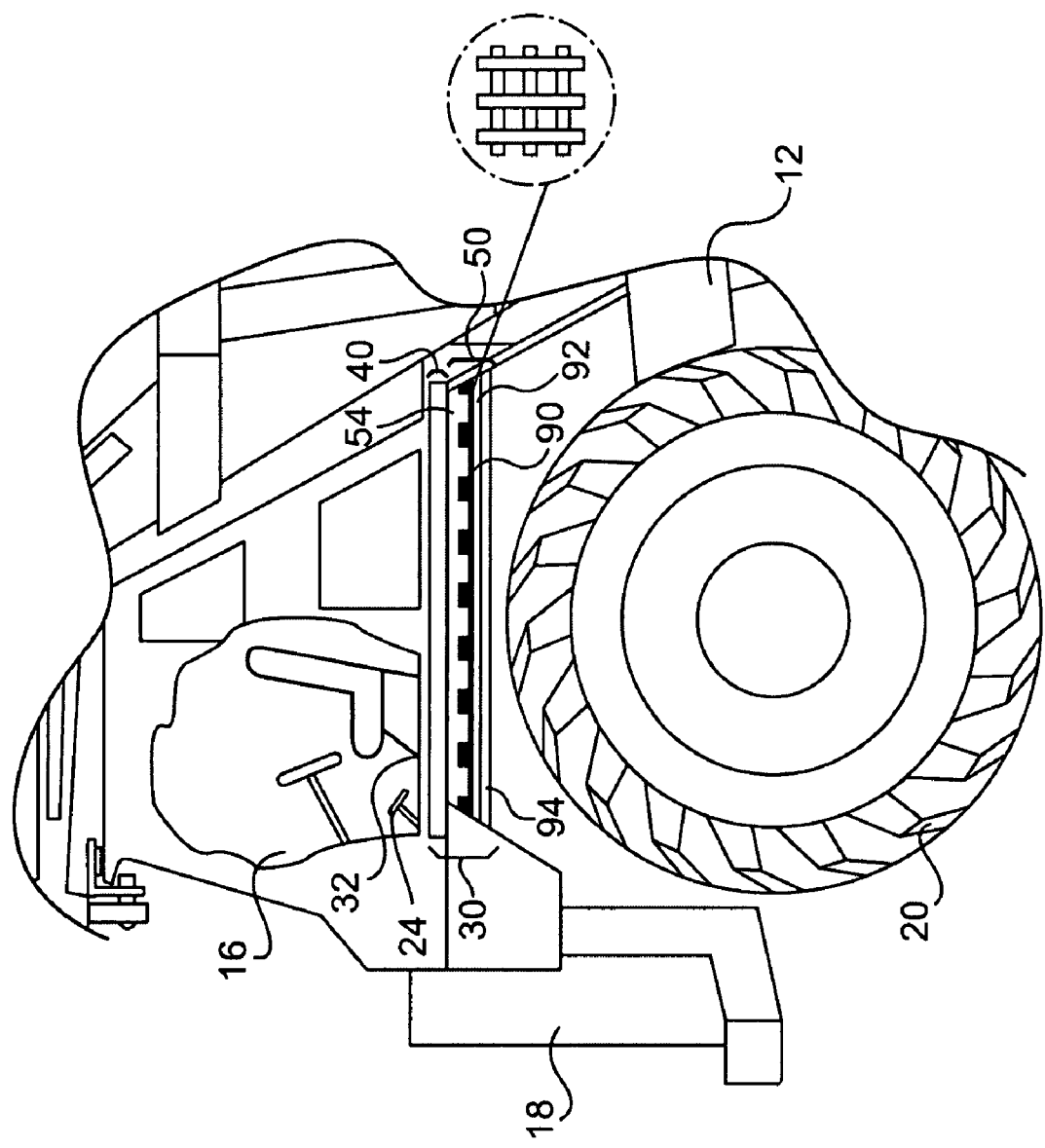
FIG. 6 is a pictorial illustration of another exemplary disclosed cab floor protection system that may be used with the machine of FIG. 1.

In a final exemplary embodiment, as in FIG. 6, the first structure 50 may be composed of three layers, including a first layer 90, a second layer 92, and a third layer 94. The first layer 90 may be a metallic matrix, the second layer 92 may be a metallic plate, and the third layer 94 may be an energy absorbing foam. The energy absorbing foam in the third layer 94 of this embodiment may diminish the pressure wave by crushing and splintering away and help distribute the pressure from the pressure wave across the lengths of the second layer 92. The pressure transmitted to the second layer 92 may cause the second layer 92 to deform and possibly fail into the metallic grid of the first layer 90 thereby absorbing energy and diminishing the pressure wave. The combined layers of the first structure 50 may work in conjunction with the second structure 40 to help reduce the amount of energy reaching the cab floor 32.

INDUSTRIAL APPLICABILITY

The floor protection system disclosed herein may be applied to various types of machines, where tire blowouts may be a concern for the integrity of a cab. The floor protection system may sufficiently protect the cab from tire debris and a pressure wave resulting from a tire blowout. That is, the various structures may be able to dissipate some of the energy released in such an event sufficiently to minimize or eliminate cab damage.

A method for protecting cab 16 from the results of a tire blowout will now be described. In the event of a tire blowout, a pressure wave may propagate in all directions from the deflating tire. The magnitude of the pressure wave depends largely on the rate of deflation and the pressure of the tire experiencing the blowout. In some situations the magnitude of the pressure wave itself may be large enough to cause damage to the cab, and propel tire debris at high velocity toward the cab 16.

As the pressure wave moves from the front tire 20 toward the cab 16, it may encounter the first structure 50. The first structure 50 may absorb and deflect a substantial amount of the energy away from the cab 16. Energy may be absorbed by the first structure 50 through mechanical processes such as plastic deformation of the ductile layers, and fracture of the more rigid layers. For example, the pressure wave may cause the second layer 62 of the FIG. 3 embodiment to plastically deform into the first layer 60 until the second layer 62 pushes the first layer 60 to yield and then fracture. Some of the energy required to force the two layers to yield may be stripped from the pressure wave, thereby diminishing the magnitude of the pressure wave. The pressure wave may be further diminished as it enters air gap 54 and releases energy into the atmosphere.

If the magnitude of the pressure wave is large enough to pass through the first structure 50 and the air gap 54, it may encounter the second structure 40. The second structure 40, composed of a high tenacity non-laminate metallic laminate may further diminish the magnitude of the pressure wave by elastic stretching.

One benefit of the disclosed solution is its ability to protect a cab, while only minimally impacting vehicle weight. The disclosed solution may offer both safety and performance, without sacrifice to vehicle stability, efficiency, and loading capacity.

It will be apparent to those skilled in the art that various modifications and variations can be made to the floor protection device, without departing from the scope of the disclosure. Other embodiments of the disclosed floor protection device will be apparent to those skilled in the art from consideration of the specification and practice disclosed herein. It is intended that the specification and examples be considered as exemplary only, with a true scope being indicated by the following claims and their equivalents. For example, it is contemplated that, instead of foam layer 94, an elastomeric material may be substituted, if desired.

What is claimed is:

1. A protection system for a vehicle cab, the protection system comprising:
    a first structure disposed between a floor of the vehicle cab and a tire, the first structure including a substantially porous metallic matrix formed by joining together elongated portions of metallic material in a grid pattern;
    a second structure disposed between the first structure and the floor of the vehicle cab, the second structure including a non-metallic laminate; and
    an air gap disposed between the first structure and the second structure.

2. The protection system of claim 1, wherein the air gap between the first and second structure is between 50 millimeters and 250 millimeters in depth.

3. The protection system of claim 1, wherein the non-metallic laminate is an aromatic polyamide.

4. The protection system of claim 1, wherein the first structure includes a metallic plate having dimples disposed between the floor of the vehicle cab and the tire.

5. The protection system of claim 1, wherein the first structure includes a first layer disposed adjacent to the air gap and at least a second layer disposed between the first layer and the tire, the first layer comprising the metallic matrix.

6. The protection system of claim 5, wherein the second layer is a metallic plate.

7. The protection system of claim 6, wherein the metallic plate has dimples disposed between the floor of the vehicle cab and the tire.

8. The protection system of claim 5, wherein the first structure also has a third layer connected to the second layer and disposed between the second layer and the tire.

9. The protection system of claim 8, wherein the third layer is an elastomer disposed between the floor of the vehicle cab and the tire.

10. The protection system of claim 8, wherein the third layer is an energy absorbing foam disposed between the floor of the vehicle cab and the tire.

11. The protection system of claim 1, wherein the first structure and the second structure are located above the tire and span across a majority of a diameter of the tire.

12. The protection system of claim 1, wherein the air gap is disposed directly between the first structure and the second structure.

13. A method of protecting a vehicle cab from a tire blowout, the method comprising:
    providing a metallic first structure between the vehicle cab and the tire for deflecting and absorbing energy from the tire blowout, the first structure comprising:
        a first layer comprising a substantially porous metallic matrix formed by joining together metallic elongated portions in a grid pattern, and
        a second layer comprising a metallic plate disposed between the first layer and the tire;
    providing a non-metallic second structure between the first structure and the vehicle cab for deflecting and absorbing energy from the tire blowout; and
    providing an air gap between the first structure and the second structure, the first layer of the first structure being disposed adjacent to the air gap.

14. The method of claim 13, wherein the second structure is a non-metallic laminate.

15. The method of claim 14, the non-metallic laminate is an aromatic polyamide.

16. The method of claim 13, wherein the first structure and the second structure are located above the tire and span across a majority of a diameter of the tire.

17. A machine, comprising:
    a tire;
    a vehicle cab operatively connected to the tire and having a cab floor;
    a metallic structure located between the floor and the tire to deflect debris and absorb energy through plastic deformation and fracture, the metallic structure comprising:
        a first layer comprising a substantially rigid metallic matrix formed by joining together a plurality of metallic elongated portions, the metallic matrix including first portions that are generally parallel to each other and second portions that are generally parallel to each other, the first portions being disposed at an angle with respect to the second portions, and
        a second layer adjacent to the first layer, the second layer comprising a metallic plate; and
    a non-metallic structure located between the metallic structure and the cab floor and being configured to absorb energy through elastic deformation, the metallic structure and the non-metallic structure being located above the tire and spanning across a majority of a diameter of the tire.

18. The machine of claim 17, further comprising an air gap disposed directly between the metallic structure and the non-metallic structure.

19. The machine of claim 17, wherein the second layer is formed of a material that is more ductile than a metallic material used to form the metallic matrix.

20. The machine of claim 17, wherein the first portions are spaced from each other and the second portions are spaced from each other so that the metallic matrix is substantially porous.

* * * * *